UNITED STATES PATENT OFFICE.

WILLIAM ATKINSON AND JOSEPH SMITH, OF BRADFORD, ENGLAND.

ENAMELING OR GLAZING METALLIC AND OTHER SURFACES.

No. 843,985.　　　　　　Specification of Letters Patent.　　　　　Patented Feb. 12, 1907.

Application filed October 6, 1906. Serial No. 337,776.

*To all whom it may concern:*

Be it known that we, WILLIAM ATKINSON and JOSEPH SMITH, residing at Bradford, in the county of York, England, have invented certain new and useful Improvements in Enameling or Glazing Metallic and other Surfaces; and we do hereby declare the following to be a full, clear, and exact description of the invention, such as will enable others skilled in the art to which it appertains to make and use the same.

The subject of this invention is a process of coating metallic and other surfaces or objects with glass, porcelain, or the like material.

Metallic objects in large variety composed, for example, of iron, steel, copper, or various alloys can advantageously be provided with a lamina or layer of glass, porcelain, or the like, and especially where such objects are exposed to the action of moisture or to chemical action in general or to electric currents.

According to our process the articles to be coated with glass, porcelain, or the like are first thoroughly cleaned, which cleaning may be accomplished in any convenient manner—as, for example, by washing the articles in an acid-bath consisting, say, of twenty-five parts of sulfuric acid and one hundred parts of water. The articles may be plunged into the acid-bath and then thrown into a furnace, where they are allowed to remain until attaining a red heat, when the acid deoxidizes the surface of the metal. After the articles have been cleaned a flux is applied thereto, which flux, in the case of wrought-iron or steel articles, may consist of one hundred and thirty parts of white opal cullet, twenty parts of bicarbonate of soda, and twelve parts of boracic acid. Where the articles to be coated are made of cast-iron or metals or alloys other than wrought-iron and steel, it will be found necessary to use twenty-five parts of bicarbonate of soda and thirteen parts of boracic acid with the same quantity—that is, one hundred and thirty parts—of white opal cullet. These constituents having been reduced to a uniform mass by melting in a furnace are run into water, after which they are pounded into a powder and ground, with water, into an impalpable paste. The flux thus formed is then applied to the article under operation and allowed to dry, when the article is fired or baked. White opal cullet or other suitable form of glass, such as pure flint-glass or soda-glass, formed into a liquid paste in the same manner as the flux—that is, by being melted in a furnace, run into water, pounded into powder, and ground with water—is then applied to the article either in the liquid state or it may be in the form of plaster. The article is then gradually dried and afterward fired at a high temperature, preferably just under the melting-point of the metal. If desired, another coat or lamina of glaze may then be applied. Porcelain shards or broken or waste porcelain may be applied in the same way, with the exception that porcelain, being infusible, will be heated to a red heat (instead of being melted) before being thrown into water.

The process though peculiarly adapted for coating metallic surfaces or objects—such, for instance, as rollers used in dyeing-machines and the like, loom picker-spindles, spinning, twisting, and other guides, and a variety of similar objects—is applicable also for coating non-metallic surfaces or objects, such as pottery.

We claim as our invention—

1. A process of enameling or glazing metallic and other surfaces, characterized by the use of a flux comprising white opal cullet, bicarbonate of soda, and boracic acid, in suitable proportions, the said constituents being melted together in a furnace, run into water, pounded into powder, and ground with water into an impalpable paste.

2. A flux consisting of a mixture of white opal cullet, bicarbonate of soda, and boracic acid.

In testimony whereof we affix our signatures in presence of two witnesses.

WILLIAM ATKINSON.
　　　　　　　　JOSEPH SMITH.

Witnesses:
　　LEONARD H. CROWLEY,
　　W. H. KENNARD.